United States Patent [19]

Lawler et al.

[11] Patent Number: 5,585,838
[45] Date of Patent: Dec. 17, 1996

[54] PROGRAM TIME GUIDE

[75] Inventors: Frank A. Lawler, Seattle; Joseph H. Matthews, III, Redmond, both of Wash.

[73] Assignee: Microsoft Corporation, Redmond, Wash.

[21] Appl. No.: 435,968

[22] Filed: May 5, 1995

[51] Int. Cl.$^6$ .................................................. H04N 7/173
[52] U.S. Cl. .............................. 348/13; 348/12; 348/906; 455/5.1
[58] Field of Search .............................. 348/6, 7, 12, 13, 348/906, 468, 554, 563, 564; 455/4.2, 5.1, 6.1; H04N 7/16, 7/173, 5/445

[56] References Cited

U.S. PATENT DOCUMENTS

| | | |
|---|---|---|
| 3,956,579 | 5/1976 | Doumit . |
| 4,199,781 | 4/1980 | Doumit . |
| 4,691,351 | 9/1987 | Hayashi et al. . |
| 4,706,121 | 11/1987 | Young . |
| 4,751,578 | 6/1988 | Reiter et al. . |
| 4,787,063 | 11/1988 | Muguet . |
| 4,847,696 | 7/1989 | Matsumoto et al. . |
| 4,894,789 | 1/1990 | Yee . |
| 4,908,713 | 3/1990 | Levine . |
| 4,977,455 | 12/1990 | Young . |
| 5,003,384 | 3/1991 | Durden et al. . |
| 5,038,211 | 8/1991 | Hallenbeck .............................. 348/473 |
| 5,047,867 | 9/1991 | Strubbe et al. .......................... 348/564 |
| 5,109,414 | 4/1992 | Harvey et al. . |
| 5,231,493 | 7/1993 | Apitz . |
| 5,253,066 | 10/1993 | Vogel . |
| 5,293,357 | 3/1994 | Hallenbeck . |
| 5,353,121 | 10/1994 | Young et al. ............................ 348/563 |
| 5,414,455 | 5/1995 | Hooper et al. ............................... 348/7 |

FOREIGN PATENT DOCUMENTS

| | | |
|---|---|---|
| 503070 | 9/1992 | European Pat. Off. . |
| 4-213983 | 8/1992 | Japan . |
| 5-284479 | 10/1993 | Japan . |
| 6-225236 | 8/1994 | Japan . |
| 9501057 | 1/1995 | WIPO .............................. H04N 7/16 |

OTHER PUBLICATIONS

"CEEFAX–A Proposed New Broadcasting Service", Journal of the SMPTE, Edwardson et al., Jan. 1974.
"The Hi–OVIS Optical Communication System", Proceedings of the 9th European Microwave Conference, Kawahata, Sep. 17, 1979.
"An Automated Programming Control System for Cable TV", Technical Paper NCTA Annual Convention 29th National Cable TV Association, Stern, May 18, 1980.
"An Interactive Menu–Driven Remote Control Unit for TV Receivers and VC–Recorders", IEE Transactions on Consumer Electronics, Zeisel et al., Aug. 1988.

*Primary Examiner*—John K. Peng
*Assistant Examiner*—Chris Grant
*Attorney, Agent, or Firm*—Klarquist Sparkman Campbell Leigh & Whinston

[57] ABSTRACT

A program time guide for an interactive viewing system allows a user to control the time and channels for which program information is displayed. The user can navigate through the program time guide to identify and select desired programs. The program time guide displays information for various types and sources of programming by assigning each program source a channel number. Selecting a program on a particular channel causes the system to tune to an associated frequency to receive video signals, launch a computer executed application which generates displayed information, or to perform some other activity associated with that channel or program.

21 Claims, 9 Drawing Sheets

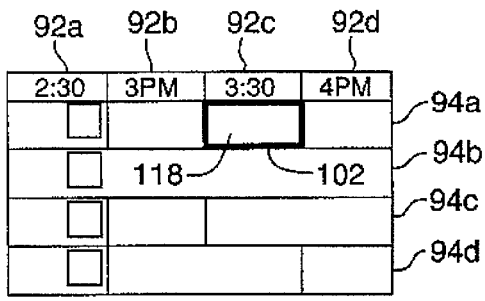
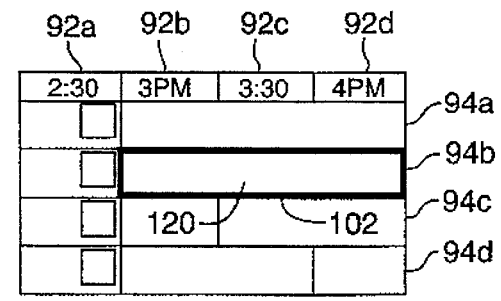
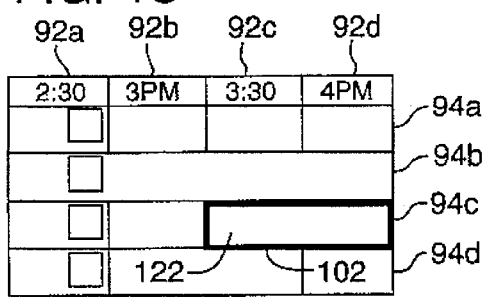
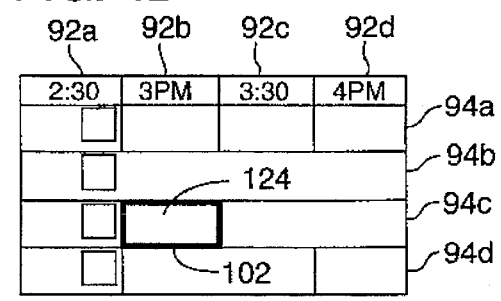
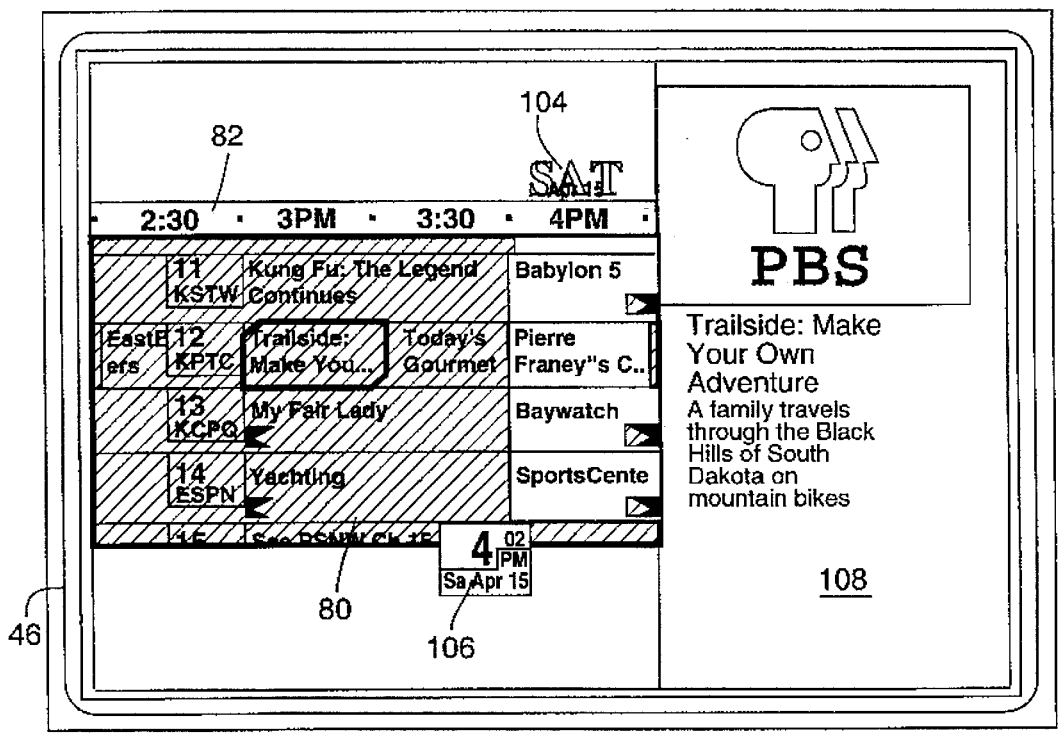

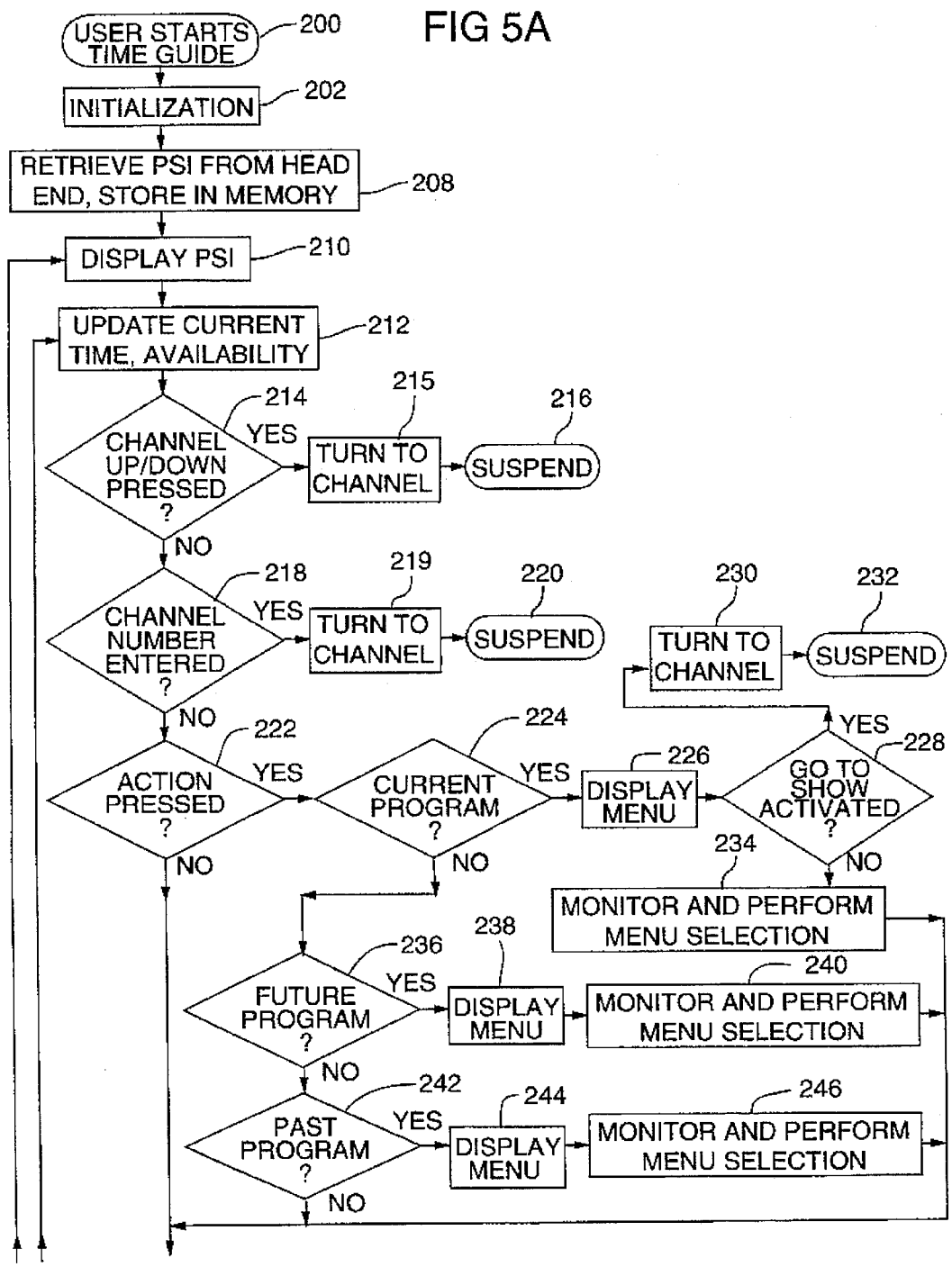

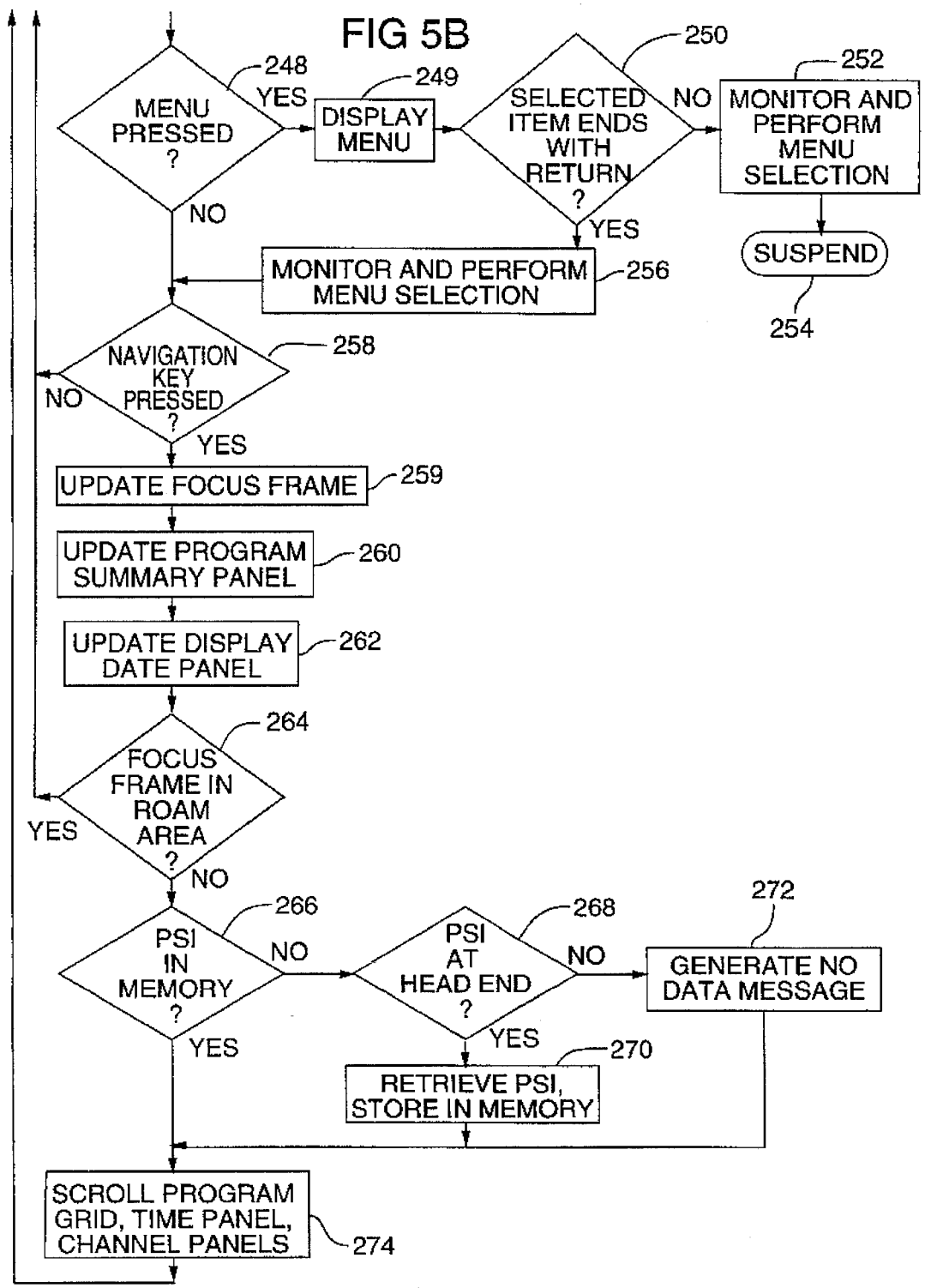

PROGRAM TIME GUIDE

BACKGROUND OF THE INVENTION

1. Field of the Invention

The present invention relates to an interactive program time guide that allows a user to selectively view and browse through program schedule information and, more particularly, to a program time guide that displays a time-based grid of program schedule information and allows the user to selectively navigate through the grid to browse program schedule information and identify desired programs.

2. Description of Related Art

As communication technology continues to expand, individuals are faced with an ever increasing number of information sources. For example, many cable television services offer dozens of different channels from which a user can choose. Some available satellite systems claim to offer hundreds of channels and it is widely expected that cable services will expand in an effort to match or exceed this capability. Similar gains in the quantity of available programs and services are anticipated in areas of communication other than television.

This dramatic increase in the amount of available programs and services greatly increases the amount and type of information accessible by a user. However, it also complicates the process of program selection. Unless a user is able to quickly and easily identify desired programs and services and determine when those programs and services are available, most users will not be able to realize the full potential of the ever expanding access to new programs, services and information.

In traditional broadcast television, because there were typically only a relatively few programs available, it was frequently possible for a user to simply remember the time and channel of desired programs based on prior viewing experience. With the advent of expanded cable and satellite television systems having an ever increasing number of channel and program options, it is increasingly difficult to select programs in this manner.

Accordingly, many users select programs by stepping through channels to identify available programs. Once identified, the user can select from available programs for further viewing. However, as the number of available channels expands, the time needed to step through the channels also expands and the viability of this program selection method decreases. Moreover, the process of identifying programs is sometimes complicated because commercials or the like are being shown at the time that a particular channel is selected. This process also does not allow a user to determine what programs will be available in the future. Thus, the user might select a current program that conflicts with a later program that the user would prefer.

To assist users, many publishers provide printed schedule information. Typically such printed schedule information is presented as a time-based grid with increments of time arranged in columns and various channels arranged in rows. Program titles are printed in the grid at the intersection of the time at which they air and the channel on which they are broadcast. Such information, however, may often be incomplete and include information for only prime time programs or for only the most widely available channels. The use of printed program guides can also be cumbersome and inconvenient because the printed guides can be misplaced or lost and are not always readily available when a user wishes to select a program. Moreover, as the number of available program alternatives expands, such printed program guides become more and more unwieldy.

Some service providers provide on-line program guides. For example, on some systems a channel is dedicated for broadcasting a display of program schedule information. Typically, the information is presented as a time-based grid similar to conventional printed program guides. However, because the size of the screen is limited, such systems can typically display only a small amount of program schedule information at any given time.

To accommodate the limited display size, such systems typically limit the time period for which information is displayed. Commonly, schedule information is displayed only for about four half-hour time periods, beginning with the current half-hour time period. To allow the display of program schedule information for all available channels, such systems typically scroll automatically through the available channels, usually in numerical order.

Such systems typically cannot be controlled by the user. Thus, the user cannot select the time or channel for which program schedule information is displayed. Rather, a user seeking information about a particular channel must wait for the system to scroll to that channel in the grid. This can be frustrating and time consuming, particularly for systems displaying information for a large number of available channels. These systems typically provide no way for a user to view program information for a time different than the limited time period displayed in the automatically scrolling grid. Thus, a user cannot review past program information and cannot view future program information unless it happens to fall within the limited time period included in the scrolling grid. This shortcoming limits a user's ability to plan future viewing in advance.

At least one available system allows a viewer limited ability to control the presentation of television program schedule information. In this system, a limited amount of television program schedule information is encoded and broadcast as a non-visible part of a television signal. A viewer can purchase special decoder equipment, which may be included as part of a television, to intercept and decode the transmitted television program schedule information. The decoded information is then stored within the viewer's decoder equipment where it can be displayed and viewed on demand. This system, however, allows for only a limited amount of television program schedule information to be stored on-site and does not allow a viewer to query, on demand, the source of the program schedule information to obtain additional program information. Thus, although the viewer may control display of that television program schedule information which is stored on-site, the viewer cannot obtain or view additional program schedule information on demand.

SUMMARY OF THE INVENTION

Accordingly, it is an object of the present invention to provide a system that allows a user of an interactive viewing system to quickly and easily identify programs for viewing.

A system in accordance with one aspect of the present invention provides a program time guide for an interactive viewing system. The interactive viewing system typically includes a central head end in bidirectional communication with one or more viewer stations. Each viewer station has an interactive station controller, a video display operably coupled to the interactive station controller and an input device for providing user input to the interactive station controller. The head end makes available to the user stations a number of programs at different times and on different channels.

The program time guide in accordance with a preferred embodiment of the present invention includes a first memory located at the head end. The first memory stores program schedule information that identifies the times and channels on which various programs are available. A second memory is located at the interactive station controller. The second memory stores a portion of the same program schedule information that is stored at the head end.

The interactive station controller, in response to a user command input through the input device, generates a display on the video display of part of the program schedule information. The user can input commands, using the input device, to select the time period for which program schedule information is displayed and the channels for which program schedule information is displayed. If the selected time period or channel is not already displayed, the interactive station controller determines whether the program schedule information is stored in the second memory. If it is, the interactive station controller retrieves the program schedule information from the second memory for display on the video display. If the selected program schedule information is not stored in the second memory, the interactive station controller queries the first memory at the head end for the information.

In another aspect of the invention, the display of program schedule information includes a grid with increments of time along a first axis and channels along a second axis. Within the grid are program tiles, each associated with a program, positioned at the junction of the time at which the program is available and the channel on which the program is available. A focus frame that indicates a selected program tile is also visible in the display. The focus frame can be moved by a user to select various program tiles. Moving the focus frame to a column or row of the grid that is not currently fully displayed causes the interactive station controller to scroll the displayed program schedule information and reveal that column or row. Additional program schedule information required to scroll the display is retrieved by the interactive station controller from the second memory if it is present in the second memory. Otherwise, the interactive station controller queries the first memory for the additional program schedule information.

In a further aspect of the invention, the movement of the focus frame is anchored to a particular time increment. As the focus frame is incremented through various channels, it will expand or contract to conform with the displayed portion of the currently identified program tile. However, unless moved by the user along the time axis, the focus frame will always identify the program on the selected channel that is available during the anchoring time increment.

In another aspect of the invention, the display is color coded to indicate which programs are currently available. For example, the program tiles for currently available programs might be white and past and future programs might be shaded. As time elapses, the indication of current availability is automatically updated without requiring user input.

In yet another aspect of the invention, the program time guide treats television programs, executable applications, and other services all as channels. Thus, for example, a computer game that is available on the interactive viewer system is assigned a channel number. The game, or any other application or service, is then displayed in the program time guide just as a conventional television program. If the game, or other application, is always available, the program tile extends off both ends of the program time guide and is always colored to indicated current availability. Selection of a channel assigned to a computer executed program launches that program.

In still another aspect of the invention, where a channel number is shared by two or more program providers that are available at different times, each provider is allocated a separate row in the program time guide. During the time that any one of the sharing providers is active, program schedule information for that provider is displayed in the normal manner. At the same time, no program schedule information is displayed for inactive providers. Rather, the rows for the inactive providers will contain a reference to the then active provider sharing that channel number.

Other objects and aspects of the invention will become apparent to those skilled in the art from the detailed description of the invention which is presented by way of example and not as a limitation of the present invention.

BRIEF DESCRIPTION OF THE DRAWINGS

FIGS. 4a–4d are schematic diagrams of a program grid in accordance with a preferred embodiment of the present invention illustrating movement of the focus frame within the displayed portion of a program grid.

FIGS. 5a–5b are a flow diagram illustrating the operation of a preferred embodiment of a program time guide in accordance with a preferred embodiment of the present invention.

FIG. 6 illustrates the screen of the video display of FIG. 3 after time has elapsed without user input.

DESCRIPTION OF THE ILLUSTRATED EMBODIMENT

Figure 1:
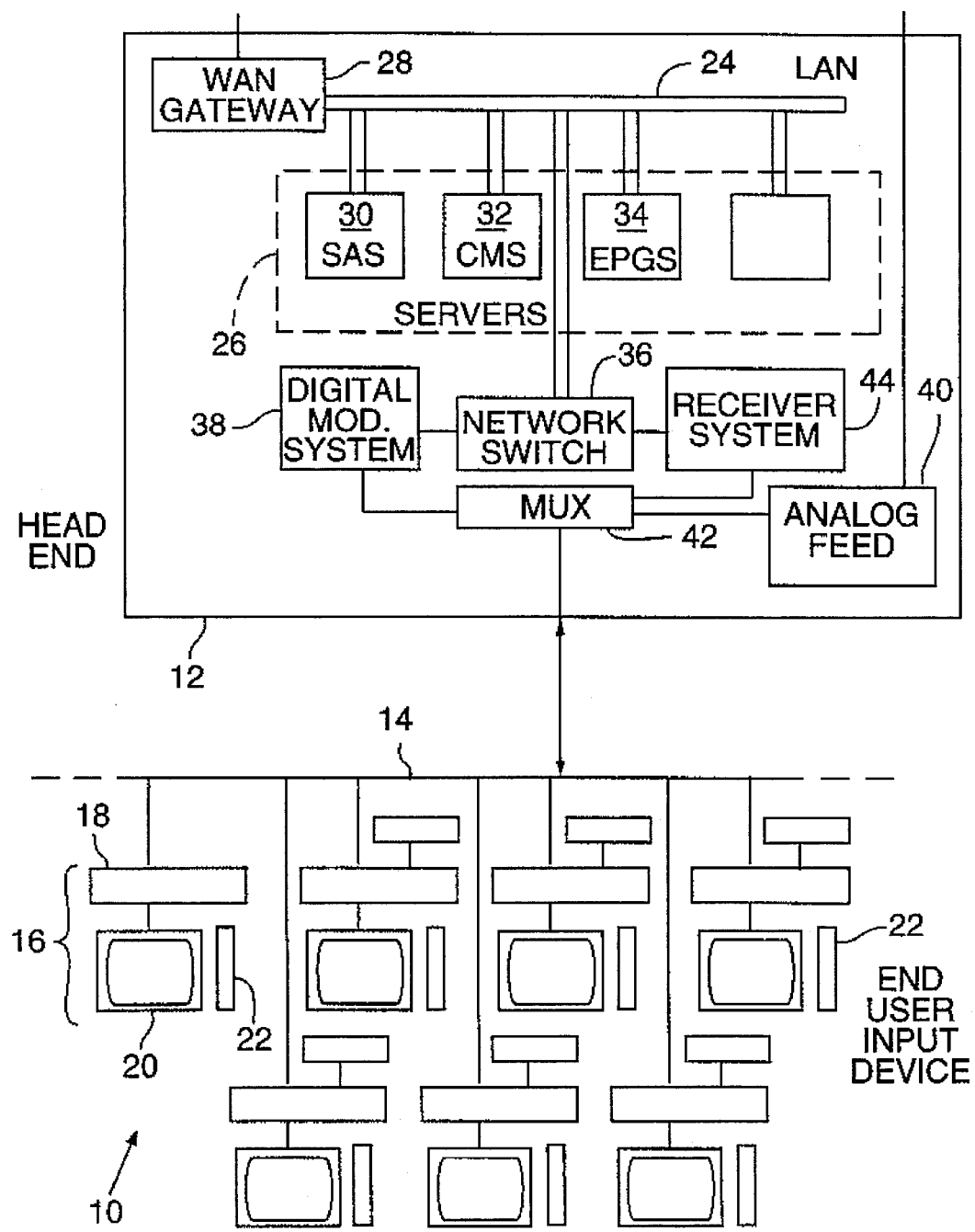
FIG. 1 is a block diagram of an interactive viewing system incorporating a preferred embodiment of the present invention.

A simple block diagram of an exemplary interactive viewing system 10 is illustrated in FIG. 1. The interactive viewing system 10 has a central head end 12 that supplies programming over a network 14 to multiple viewer stations 16 that are typically located in the homes of system users or subscribers. Each viewer station typically includes an interactive station controller 18, a video display 20, and a user input device 22. The viewer stations 16 accept user input and can, in addition to receiving programming from the head end 12, transmit information back to the head end. In this manner, the interactive viewing system 10, allows for independent two-way communication between the head end 12 and each of the viewer stations 16.

The interactive viewing system 10, which is an interactive television system in the illustrated example, serves as an operating environment for implementing a program time guide in accordance with a preferred embodiment of the present invention. Of course, it should be appreciated that the program time guide of the present invention can be implemented in a variety of other environments and may be adapted to a wide variety of systems in which time-dependant programming is provided. In particular, the programming provided by the head end 12 is not limited to traditional television programs. Rather, the programming may include standard analog video signals (e.g., NTSC, PAL or SECAM), digital video signals (e.g., MPEG1 or MPEG2), digital information related to computer-executed applications, or other types of programming. The present program time guide is suitable for use with systems offering a variety of program formats and types.

For purposes of simplicity, the interactive viewing system 10 is described with reference to widely available systems and standards, including conventional analog television receivers and cable-based video networks. It should also be appreciated, however, that the particular components of the interactive viewing system 10 may be implemented in accordance with a variety of conventions, standards, or technologies without departing from the underlying concepts of the present invention. For example, the conventional analog television receivers and cable-based video network illustrated in FIG. 1 could be implemented as digital video receivers and a satellite downlink transmission system, respectively. Likewise, the cable-based network could be an electrically conductive cable network, an optically conductive cable network, some other network technology, or a combination of these technologies.

As shown in FIG. 1, the head end 12 of the illustrated interactive viewing system includes a digital local area network (LAN) 24 that includes multiple computer servers 26 for performing various interactive system applications or functions and a digital communication gateway 28 to a wide area network (WAN) (not shown). The servers 26, which store and process information at the head end, may include, for example, service and application servers 30, continuous media servers 32, and electronic program guide data servers 34.

The service and application servers 30 process interactive service requests from subscribers and provide services and applications associated with network security, monitoring, object storage, financial transactions, data access, and other administrative functions. The continuous media servers 32 provide storage and on-demand or near on-demand delivery of digitized video information. The digitized video information can include video programming of substantially any duration ranging from individual image frames and brief video clips to full-length motion pictures.

The electronic program guide data server 34 stores program schedule information. For example, the program schedule information may include a program schedule database that identifies what program is available on a given channel at a given time. The program schedule information may also contain additional information about any particular program, such as, a brief description of the program, the stars of the program, a link to a video preview (stored on the continuous media server 32) for the program, whether the program is closed captioned, whether the program is stereo or a variety of other information. Such information is commercially available, for example, from Tribune Media Services or TV Data, both of Glens Falls, N.Y. Preferably, such information is delivered to the head end 12 via digital communication gateway 28 and an associated wide area network.

As used here, the servers 26 may include various types of memories for storing information and various types of processors for processing information. Various functions of the servers described here may be combined so as to be carried out by a single server or may be divided and allocated among more than one server. Moreover, there may likely be a variety of functions and services carried out by the servers 26 which are not described here. The servers 26 communicate with the viewer stations 16 via a network communication switch 36, such as an asynchronous transfer mode (ATM) switch. For communication from the servers 26 to the viewer stations 16, the network communication switch 36 arranges digital information from the servers 26 in a standard bidirectional digital communication format for transmission over the network 14. For communication from the viewer stations 16 to the servers 26, the network communication switch 36 converts digital information from a standard bidirectional digital communication format for delivery to the servers 26.

In the exemplary system illustrated in FIG. 1, digital information from the servers 26 is frequency modulated by a digital modulator system 38 for transmission over the network 14. Digital information that includes video programming is preferably modulated at frequencies greater than the standard analog television frequency range, which is 50–450 MHz under the NTSC television standard. Digital information that does not include video programming may be modulated at baseband frequencies that are less than the standard analog television frequencies, modulated at frequencies between the standard analog television frequencies, or modulated at frequencies above the standard analog television frequencies.

The head end 12 may be provided with analog signals through an analog feed 40. The analog signals provided to the head end may be standard analog video signals for conventional cablecast of television programs or other analog information. A multiplexing system 42 receives and mixes the frequency modulated digital information from the digital modulator system 38 and analog signals obtained from the analog feed 40 and delivers a composite signal to the interactive network 14 where it is made available to viewer stations 16. A reverse channel receiver system 44 receives and demodulates communications from the viewer stations 16 for processing by the servers 26.

Preferably, the network 14 carries such bidirectional communication between the viewer stations 16 and the head end 12. Alternatively, communication between the viewer stations 16 and the head end 12 can be carried by different communication systems. For example, communication from the head end 12 to the viewer stations 16 could be carried on a satellite downlink while communication in the other direction is carried on a terrestrial modem link.

Figure 2:
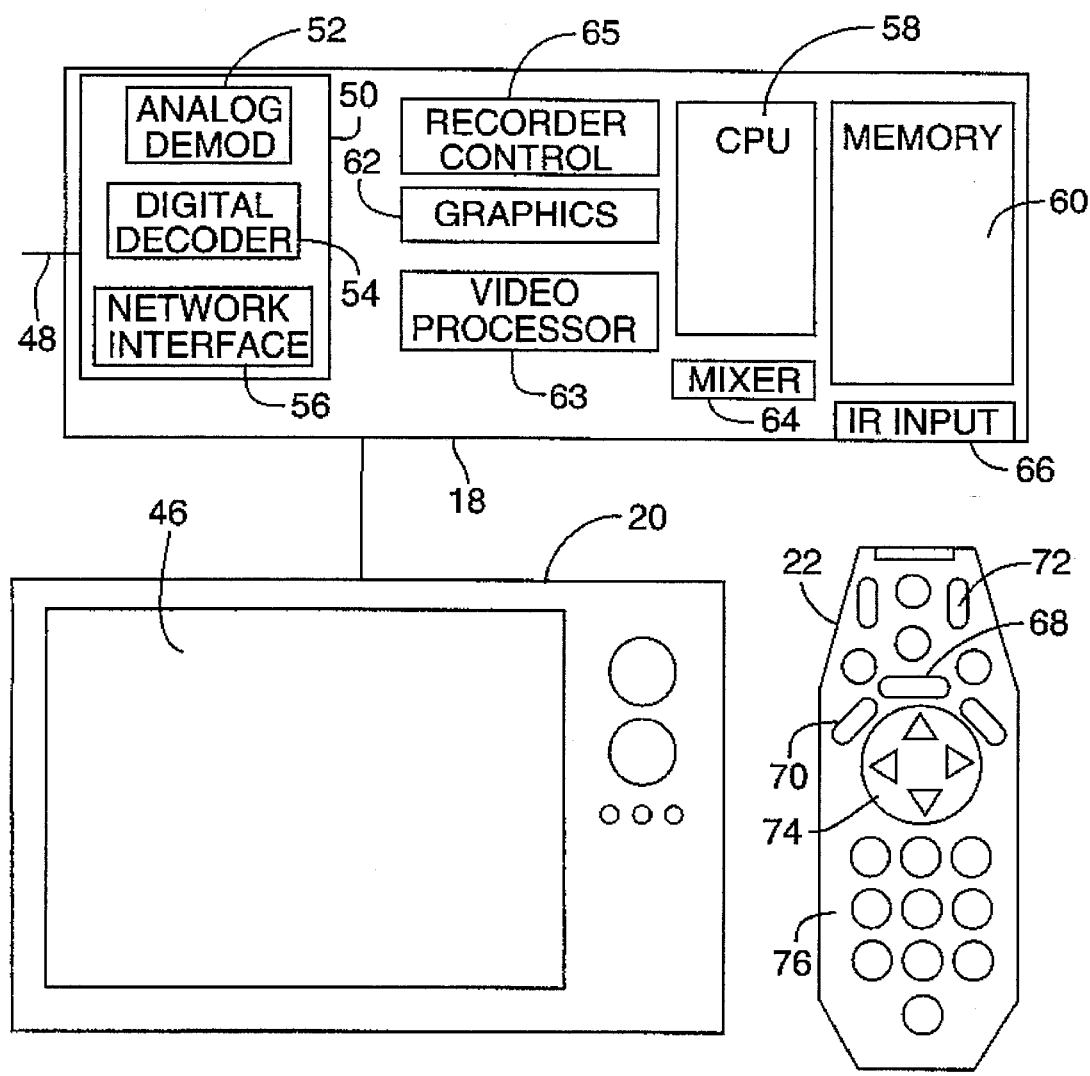
FIG. 2 is a block diagram of a viewer station as illustrated in FIG. 1.

A simplified block diagram of an exemplary viewer station 16 is illustrated in FIG. 2. The illustrated viewer station includes an interactive station controller 18 which is sometimes referred to as a set top box, at least one video display 20 such as a television, and an input device 22 such as an infrared remote control. Although it is shown distinct from video display 20, the interactive station controller 18 could alternatively be integral with video display.

The interactive station controllers 18 transmit information to and receive information from the head end 12. The information typically relates to applications executed by processors residing at the head end 12 and the interactive station controller 18, as described below in greater detail.

The interactive station controller 18 controls the video display 20 and communicates with the head end 12. Controlling the video display 20 of a conventional analog type may include, for example, delivering an analog video signal directly to the video display 20 for display on a screen 46, converting a digital video signal to a suitable analog form for display, generating a video signal for display, or executing an application that includes displays on video display 20.

The interactive station controller 18 includes an input 48 from network 14 that delivers communications or information from the central head end 12 to a communication interpretation system 50 having, for example, an analog television demodulator 52, a digital video decoder 54, and a digital network communication interface 56. The demodulator 52 functions as a conventional television tuner for selecting one or more of multiple conventional analog video signals present at input 48. The video decoder 54 functions as a digital equivalent of demodulator 50 for selecting one or more of multiple digital video signals present at input 48. The network communication interface 56 communicates with digital information which may be carried over baseband frequencies below the conventional analog video signal frequencies, over frequencies between conventional analog video signal frequencies, and over frequencies above conventional analog video signal frequencies.

A central processing unit (CPU) 58 in conjunction with a memory system 60 controls operation of the interactive station controller 18. For example, the CPU 58 controls selection of analog-based programming, digital-based programming or applications delivered from the head end 12, accesses or activates selected applications, or delivers information to or requests information from the head end 12.

The interactive station controller 18 also may include a graphics subsystem 62 that is controlled by the CPU 58 to form graphics images, including user interface displays, on the video display 20. A video processor subsystem 63, also controlled by the CPU 58, provides control in generating and displaying video images. A mixer 64 receives the programming or applications signals received from the central head end 12 or CPU 58, graphics image signals from graphics subsystem 62, and video image signals from the video processor subsystem 63 and delivers a mixed image signal to video display set 20. As used here, mixing may include compositing, blending, and masking of image sources such as digital video, analog video, locally generated graphics and various overlays and bitmap images.

The interactive station controller 18 also includes an infrared receiver and decoder system 66 that receives user input from the user input device 22 and delivers the input to the CPU 58. The input device 22 can be used by a user of the interactive viewer system 10 to input commands. The input device 22 is provided with a number of keys which may be pressed by a user to input commands. Based upon the keys pressed by a user, the input device 22 generates and emits infrared signals. These signals are detected by the infrared receiver and decoder system 66 of the interactive station controller 18, decoded, and provided to the CPU 58. The commands may be processed by the interactive station controller 18, may be communicated to the head end 12 for processing, or a combination of both. In the example system illustrated in FIG. 2, the input device 22 is a hand-held infrared remote control.

The illustrated input device includes at least a menu key 68, an action key 70, a channel up/down key 72, a navigation key 74, and a numeric keypad 76. The use and function of those keys on the input device 22 that are used in the context of the current program time guide are described further below.

Figure 3:
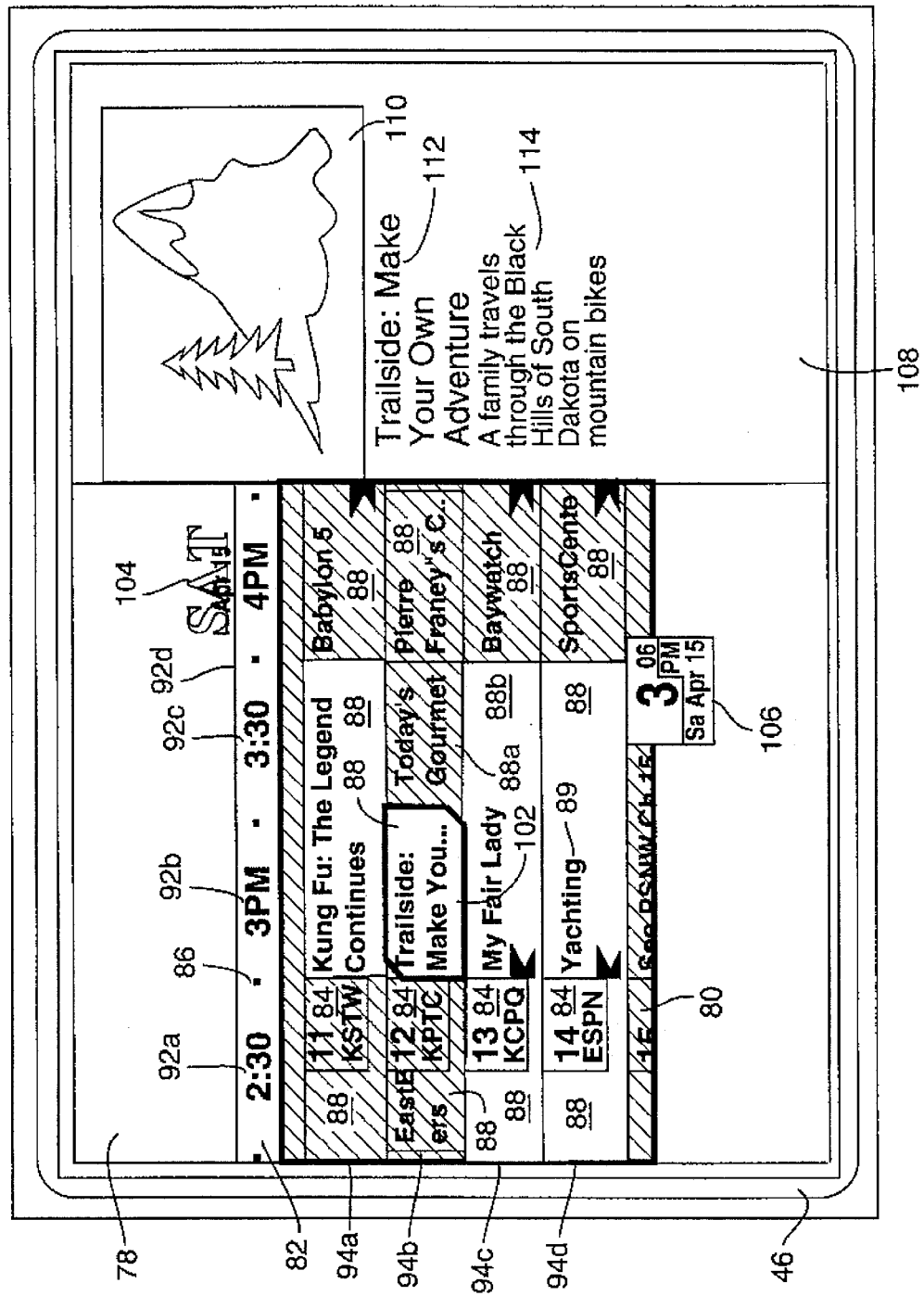
FIG. 3 illustrates the screen of the video display on which a sample of a preferred display of the program time guide is shown.

The screen 46 of the video display 20 showing an exemplary display screen 78 of a program time guide in accordance with a preferred embodiment of the present invention is shown in FIG. 3. The interactive station controller 18 controls the generation and display of the program time guide on the video display 20. In generating the program time guide, the interactive station controller 18 can receive input from the input device 22, can obtain information from the head end 12, and can utilize information stored in the memory system 60 at the interactive station controller.

The exemplary display screen 78 includes a program grid 80 which provides a user with program schedule information as to the times and channels on which various programs are available. Associated with the program grid are a time panel 82 and a number of channel panels 84. The time panel 82 extends horizontally across the upper portion of the program grid 80 and is, in the illustrated display, divided into half-hour time increments. The time increments are labeled and are separated by dividers 86 so as clearly delineate a grid column for each time increment. The channel panels 84 are arranged along a vertical axis to identify rows within the program grid 80. In the illustrated program grid, time is on the horizontal axis and channels are on the vertical axis. However, these could be switched in other embodiments.

The program grid 80 contains a number of program tiles 88. Each program tile 88 corresponds to a program and is provided with a label 89 to identify that program. Each program tile 88 is positioned within the program grid 80 at the intersection of the times during which the program is available and the channel upon which the program appears. The label 89 of the program tile 88 may be the program title, an abbreviation of the program title or any other indicator which identifies the corresponding program. The label 89 is typically displayed beginning at the left hand side of the program tile 88. However, if the left-most part of the program tile 88 extends off the program grid 80 or is obscured, the label is displayed beginning in the left-most column that is fully visible. In this way, a user can readily see the label at all times.

The program tiles 88 have a uniform height. The length of each of the program tiles 88 may vary, however, and is determined by the length of the program it represents. For example, in the illustrated program grid, a half-hour program would be represented by a program tile 88a that spans one column and an hour program would be represented by a program tile 88b which spans two columns. For programs whose duration is not a multiple of thirty minutes, the program tiles can be sized to span fractions of a column. Similarly, if a program does not begin on the hour or on the half-hour, it may positioned so as to span only that portion of the column that corresponds to the time during which it is actually available.

If a program's availability extends beyond the time period displayed in the program grid, the program tile may be provided with an indicator 90 to inform the user that the program's availability extends beyond the displayed time period. The indicator may be positioned on the left hand side of a program tile to indicate that the program extends into the past and on the right hand side of the program tile to indicate that the program extends into the future. In the illustrated program time guide the indicator 90 is animated so as to be more easily seen and interpreted as well as more visually appealing.

In the illustrated embodiment, the program grid 80 includes four full columns 92a–92d and four full rows 94a–94d. Partial columns may be provided at each side of the program grid and partial rows may be provided at the top and bottom of the program grid. The partial columns and rows indicate to a user the availability of additional information beyond that displayed. Of course, it should be appreciated, that the program grid could contain any number rows and columns that can be conveniently displayed and easily viewed.

In the illustrated embodiment, the channel panels 84 are superimposed over the program tiles within the left-most column 92a in a manner that creates a visually interesting three-dimensional appearance. Although this obstructs the visibility of some of the information displayed in that column, it also allows for the display of an additional column that could not be displayed if the channel panels occupied the entire space. Moreover, default settings for the program grid can preferably be set so that the left-most column 92a will display program information for the immediately preceding time period. Thus, the partial visibility of this information is helpful to establish a context for the user but full visibility is not critical to the selection of current or future programs.

As a further aid to the user, program tiles 88 for currently available programs are colored so as to be readily identifiable. In the illustrated example, program tiles for currently available programs are white and currently unavailable programs are shaded.

The channel panel 84, in the illustrated embodiment, may include a channel number, a channel name, and, if available, a channel logo. In the case of a conventional broadcast television channel, the channel name may be the channel's call letters. If the channel has been assigned to an application or some other service, the channel name could be a descriptive acronym or abbreviation which identifies the application or service. Providing three identification criteria for each channel helps a user to easily identify the channel associated with each row of the program grid.

The program grid 80 also includes a focus frame 102 which identifies a selected program tile within the program grid. In the illustrated embodiment, the focus frame 102 identifies a selected program tile by drawing a conspicuous border around the tile. However, other methods of identifying the selected tile might also be used. For example, the focus frame 102 might identify the selected tile by shading it a different color. As explained below, the focus frame 102 can be used to obtain more information about a particular program, to navigate through the program time guide, or to perform various actions.

In addition to the program grid 80, the exemplary display screen 78 includes various other components which facilitate use of the program time guide and provide additional information to the user. For example, the illustrated display includes a display date panel 104, a current date and time panel 106, and a program summary panel 108. The display date panel 104 identifies the day of the week and the date for which program schedule information is currently being displayed. The display date panel 104 is particularly useful to help a user remain oriented when viewing program schedule information for a date other than the current date.

The exemplary display screen 78 also includes a current date and time panel 106 superimposed over a lower portion of the display. This panel informs a user of the current date and time.

In the exemplary display screen 78, the program grid 80 spans approximately two-thirds of the video display screen 46 on the left hand side. The right hand side of the video display screen 46 contains a program summary panel 108. The program summary panel 108 can be used to provide a user with more detailed information about a selected program. Preferably the program identified by the focus frame 102 is the subject of the program summary panel 108. As the focus frame 102 is moved, the program summary panel 108 is updated to provide additional information about the newly identified program.

The illustrated program summary panel 108 may include a preview window 110, the full title of the program 112, a description of the program 114, and may also contain one or more informational icons (not shown) which indicate characteristics of the program such as whether the program is closed captioned, whether the program is a rerun and whether the program is in stereo. In addition, user specific icons may be provided to indicate certain characteristics set by the user. For example, an icon can be provided to indicate whether the user has set a reminder for the indicated program or whether the user has requested recording of the indicated program. In alternative embodiments, it may be desirable to display icons for all shows within the program files 88 rather than within the program summary panel 108.

The preview window 110, which is positioned in the upper portion of the program summary panel 108 in the illustrated embodiment, contains a video preview of the selected program. In the case of a currently available program, the preview window may display a scaled version of the ongoing program. Otherwise, the preview window might display a video clip or still image for the program, or the logo for the channel on which the program is available. The program information in the illustrated program summary panel 108 is obtained upon request of the interactive station controller 18 from the head end 12. For example, the program description 114 may be obtained from the electronic program guide data servers 34 and video clips or still images may be obtained from the continuous media servers 32.

The focus frame 102, in conjunction with a navigation key 74 on the input device, allows a user to navigate through the program grid 80. The navigation key 74, shown in FIG. 2, is preferably a rocker type switch which can be operated in at least four distinct positions represented, in the illustrated embodiment, by arrows drawn on the input device. A single press on the navigation key 74 in the up direction will cause the focus frame 102 to move up one row in the program grid 80 and a single press on the navigation key 74 in the down direction will move the focus frame 102 down one row. Likewise, a single press on the navigation key 74 in the left or right direction will move the focus frame 102 to the next program tile 88 in the left or right direction, respectively. In alternative embodiments, the navigation key 74 may have more than four positions to allow diagonal movement of the focus frame. Holding the navigation key 74 in a pressed position causes the focus frame 102 to move in the corresponding direction so long as the navigation key 74 remains pressed. The navigation key 74 might also be structured to sense pressure, so that the speed with which the focus frame 102 moves increases as the pressure used to press the navigation key increases.

In the exemplary display of FIG. 3, the focus frame 102 can be moved freely within the fully visible columns 92b–92d and rows 94a–94d of the program grid, i.e. the "roam area". In the illustrated embodiment, the first column 92a, which is partially obscured by the channel panels 84, is not considered fully visible. As described below, any attempt to move the focus frame 102 beyond the roam area will cause the program grid 80 to scroll so as to maintain the focus frame within the fully visible area of the program grid.

As the focus frame 102 moves, it expands or shrinks in size to correspond to the fully visible portion of the designated program tile. To avoid confusion resulting from the changing size of the focus frame, movement of the focus frame in the vertical direction is preferably anchored to a particular column, referred to as the anchor column. Although any column could be designated as the default anchor column, in the preferred embodiment, the default anchor column is the second from the left, e.g., the left-most fully visible column 92b. The anchor column remains unchanged unless the user moves the focus frame 102 in the left or right directions, in which case the anchor column shifts to the left-most fully visible column in the program tile indicated by the focus frame. During vertical movement of the focus frame, the focus frame will always identify the program tile in the anchor column.

FIGS. 4a–4d illustrate movement of the focus frame 102 through the program grid 80. In FIG. 4a, the focus frame 102 identifies a program tile 118 that spans the third column 92c in the first row 94a of the program grid 80. For purposes of this example, it is assumed that the user has previously changed the default anchor column to the third column 92c. Thus, if the user moves the focus frame 102 to the second row 94b, as illustrated in FIG. 4b, it will continue to identify the program tile that occupies the third column 92c. However, the program tile 120 in the second row spans four columns so the focus frame 102 expands to outline that portion of the program tile 120 within the roam area. The focus frame 102 does not outline that portion of the program tile 120 in the first column 92a because the first column is partially obscured by the channel panels and is not considered part of the roam area. After moving the focus frame 102 down one row, the anchor column is still the third column 92c. Thus, if the focus frame 102 is moved down one more row, to the third row 94c, it will identify the program tile 122 that occupies the third column 92c, as illustrated in FIG. 4c. If the user then presses the navigation key once to move the focus frame 102 to the next program tile 124 to the left, as illustrated in FIG. 4d, the anchor column changes to the second column 92b.

The focus frame 102 can also be used to scroll the program grid 80 to reveal new program schedule information. In particular, when the focus frame 102 is moved to a row or column of the program grid 80 that is outside the roam area, the interactive station controller 18 obtains program schedule information for that row or column and scrolls the program grid 80 to move that row or column into the roam area. At the same time, the row or column on the opposite side of the roam area is scrolled out of the roam area.

The interactive station controller 18 also scrolls the time panel 82 when a new column is revealed and the channel panels 84 when a new row is revealed so that the time panel 82 and channel panels 84 correspond to the information displayed in the program grid 80. Likewise, when a user moves the focus frame 102 to a date that is no longer the current date, the interactive station controller 18 changes the display date panel 104 to correspond with the displayed information.

A flow diagram illustrating the basic operation of the illustrated program time guide is shown in FIG. 5. As indicated in block 200, use of the program time guide is initiated at the user's command. Preferably, the program time guide is assigned a channel number so that the user can begin a session with the program time guide by entering that channel using the numeric key pad 76 on the input device 22 or navigating to that channel using the channel up/down key 72 on the input device 22.

In some cases, the interactive viewing system may offer alternative types of program guides in addition to the program time guide. For example, the system may offer the current program time guide and also offer a program category guide which allows selection of programs based on various categories and a personalized program guide which displays programs in a manner determined by the user's preferences and viewing habits. If multiple program guides are offered, each might be assigned a separate channel. Alternatively, various program guides could be grouped as a single application having a single channel number. In this alternative, selection of the assigned channel would preferably present the user with a menu screen allowing selection of the program time guide, program category guide, or some other option. In the illustrated embodiment, the program time guide and several other program guides are all assigned to a single channel. However, turning to that channel displays, by default, the program time guide. The other program guides may be accessed on that channel from a menu displayed upon pressing the menu key 68 when in the program time guide.

In any case, once the user initiates the program time guide, the CPU 58 initializes the various parameters, block 202. For example, the CPU sets the display date and time to the current date and time. The current time increment also becomes the default anchor column and, using preferred default settings, is displayed in the second column from the left.

In the illustrated program time guide, the display channel is set to the last channel viewed before the program time guide was initiated. The preferred default is for this channel to be displayed in the second row. However, the default row could be any other row. In any case, the channel panels for available channels are, preferably, arranged in numerical order to fill the remaining rows.

The focus frame 102 is set to identify the program tile 88 for the program currently airing on the display channel.

Once the initial program time guide parameters have been set, it is necessary to obtain the program schedule information (referred to as "PSI" in FIG. 5) necessary to create the program grid 80. Upon the initiation of a session in the program time guide, this information is obtained from the head end 12 as indicated in block 208. In the preferred embodiment, program schedule information at the head end 12 is stored in a database on the electronic program guide data server 34. Preferably, the program schedule information at the head end covers a time period extending about one week into the past and two weeks into the future. Of course, this time period may vary depending on the needs and capacity of a particular system.

Initially, the CPU 58 obtains sufficient program schedule information from the head end 12 to fill a specified amount of the memory system 60 at the interactive station controller 18. This amount is preferably more than is needed to generate the initial display of the program grid 80.

Once the program schedule information is available at the interactive station controller 18, the CPU 58 can use that information to control the generation and display of the program time guide on the screen 46 of the video display 20, as represented in block 210.

As illustrated in block 212, the current time and date are set and program tiles for currently available programs are highlighted on the display to indicate their current availability to the user. The current time and date and current availability indication are preferably updated on a continuous basis, possibly by an independent portion of the system.

In the illustrated embodiment, the displayed information is not updated except in response to a user's commands. Thus, if the current time advances from one column in the program grid to the next, the focus frame 102 does not move and the displayed information does not change. However, the highlighting indicating currently available programs will shift, as appropriate so that programs which are no longer available become shaded and programs that become available are highlighted. This is illustrated in FIG. 6 which shows the exemplary display screen of FIG. 3 after about one hour has elapsed without user input. If the program time guide is displayed long enough without any commands from the user, the highlighting indicative of currently available programs will advance, or "float," forward and eventually may float completely off of the displayed program grid 80.

Referring again to FIG. 5, once the program time guide is displayed, the displayed information is not changed except upon a user command. Thus, the CPU 58 monitors to determine whether any commands are received from the input device 22. If the channel up/down key 72 is pressed, detected in block 214, the CPU turns to the appropriate channel, block 2 15, and suspends the program time guide, block 216. As indicated in block 218, if the CPU detects the entry of a channel number the CPU turns to that channel, block 219, and suspends the program time guide, block 220. As discussed in more detail below, turning to a designated channel may involve tuning a timer to receive a signal assigned to that channel, launching a computer executed application assigned to that channel, or performing some other action assigned to that channel.

Figure 7:
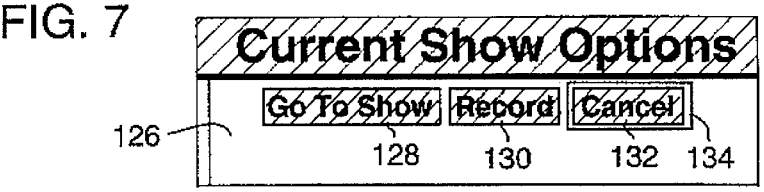
FIG. 7 illustrates a portion of the screen of the video display on which a sample of an exemplary current program options menu panel illustrating available options for a selected currently available program is displayed.

As represented by block 222 the CPU monitors to see if the action key is pressed. If the action key is pressed, the system checks to see if the focus frame indicates a currently available program, as indicated in block 224. If so, a current program options menu 126, illustrated in FIG. 7, is displayed as represented by block 226 of FIG. 5. As illustrated in blocks 228–234 of FIG. 5, the system monitors the user's menu selection and acts accordingly.

In the exemplary display of FIG. 7, the current program options menu 126 is displayed beneath the program grid 80. Upon display of the current program option menu 126, the program grid 80 and the focus frame 102 within the program grid are preferably dimmed to indicate that the current program option menu 126 is active. The illustrated current program option menu 126 contains a Go To Show button 128, a Record button 130, and a Cancel button 132. A menu focus frame 134 identifies one of the three buttons. The user can move the menu focus frame 134 to select a desired button by using the navigation key 74 on the input device 22. Once the desired button is selected, the user can press the action key 70 on the input device 22 to perform the desired action. In the illustrated current program options menu 126, activation of the Go To Show button 128 causes the interactive station controller to tone to the selected channel and suspend the program time guide. Activation of the Record button, causes the interactive station controller to activate a recording device, such as a VCR (not shown) at the viewer station 16 or a recording device (not shown) at the head end 12, to record the current program and return to the program time guide. Activation of the Cancel button 132 returns to the program time guide.

It should be appreciated that the particular menu options and actions associated with the current program options menu could vary and could include additional options. For example, if the selected program was a pay-per-view program, the current program options menu could include an option to order the program.

Figure 8:
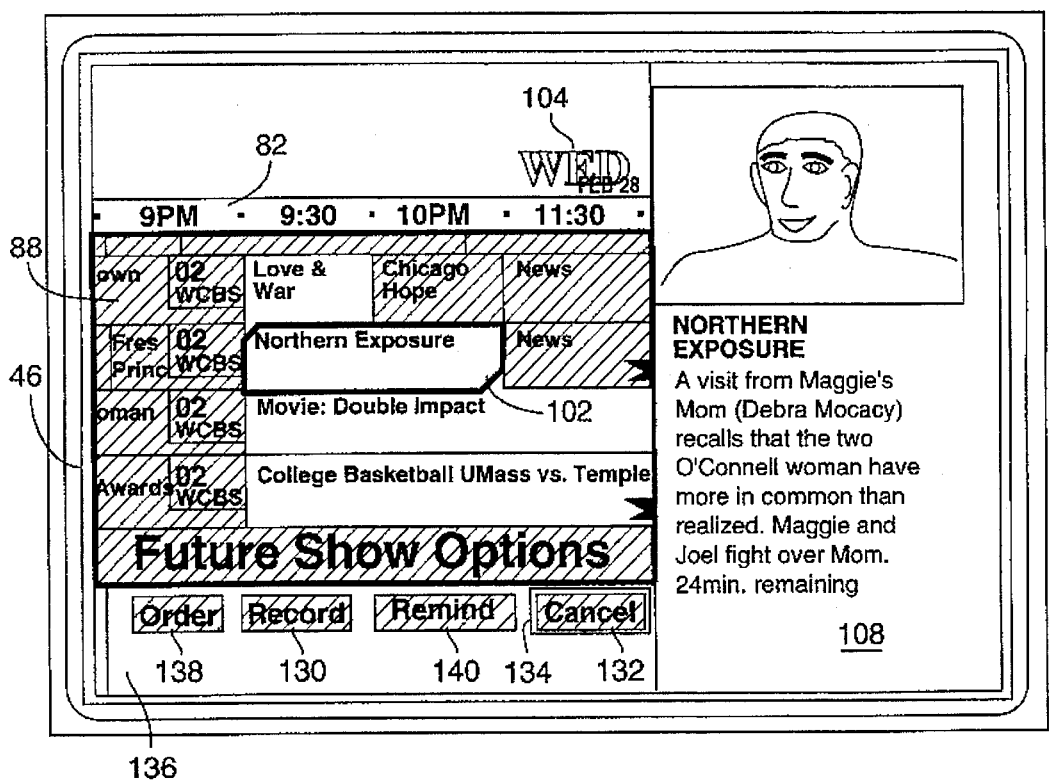
FIG. 8 illustrates a screen of the video display on which another sample of a preferred display of the program time guide is shown along with an exemplary future program options menu panel.

Referring to blocks 236 and 238 of FIG. 5, if the focus frame 102 indicates a future program, a future program options menu 136 (an example of which is illustrated in FIG. 8, is displayed when the action key is pressed. The CPU 58 then monitors the user's menu selection, carries out the requested action and returns to the program time guide as indicated in block 240.

In the exemplary future program options menu of FIG. 8, the future program options menu 136 includes an Order button 138, a Remind button 140, a Record button 130, and a Cancel button 132. Again, however, it should be appreciated that various other buttons and menu options could also be presented. Activation of the Order button 138, which appears only if the selected program is a pay-per-view program or similar type program which requires ordering, allows a user to order the selected program. The ordering may be accomplished directly or may entail the display of further menu options. Activation of the Remind button 140 causes the system to set a reminder for the selected program. The reminder is used to remind the user shortly before the selected program is available. Activation of the Record button 130 causes the system to record the show when it becomes available in the future. Activation of the Cancel button has the same effect as in the current program options menu 126 and returns to the program time guide without performing any action.

Figure 9:
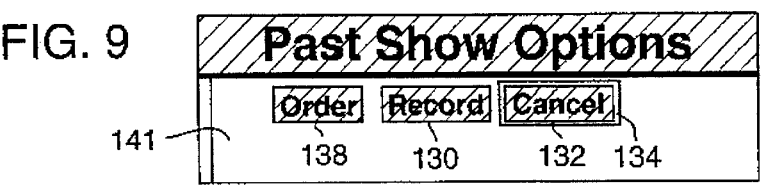
FIG. 9 illustrates a portion of the screen of the video display on which a sample of an exemplary past program options menu panel is displayed.

Referring to blocks 242 and 244 of FIG. 5, if the focus frame 102 indicates a past program when the action key is pressed, a past program options menu 141, an example of which is illustrated in FIG. 9, is displayed. The CPU 58 then monitors the user's menu selection and acts accordingly, as indicated in block 246. In the case of a past program, the menu may allow a user to determine whether the program was recorded by the user or whether a recording of the program is available for ordering from the head end. Again, the menu may also include other options. As illustrated in block 248, the CPU monitors to determine if the menu key is pressed by a user. If so, the CPU controls the display of a menu of available options, as represented in block 249. As discussed above, the options may allow a user to select an alternative program guide such as a category-based program guide or a personalized program guide based upon user preferences and viewing habits. The menu may also allow the selection of various other options and services offered by the system. In any case, the CPU monitors the user's menu selection, carries out the related functions and either returns or suspends the program time guide depending on the menu selection, as represented by blocks 250–256.

As illustrated in block 258, the CPU also monitors to see if the navigation key 74 is pressed. If not, the CPU returns to block 212, updates the current time and date and, if necessary, the highlighting indicating current program availability, and continues to monitor for user commands. If the navigation key 74 is pressed, the CPU updates the position of the focus frame, block 259; retrieves, as needed, program schedule information from the head end to update the program summary panel, block 260; and, if necessary, updates the display date panel, block 262.

The CPU 58 also determines whether the focus frame has been moved beyond the roam area, block 264. If not, the system returns to block 212 and continues to monitor for user commands. If so, the CPU 58 obtains the program schedule information necessary to scroll the program grid 80. The CPU first checks to see if the required program schedule information is available in the memory system 60 at the interactive station controller, block 266. If not, the CPU checks to see if the needed information is available at the head end, block 268. If so, the CPU obtains the information from the head end and stores it in memory system 60 at the interactive station controller as indicated in block 270. To make room for the new information, some of the program schedule information in the memory system 60 is discarded. Various algorithms can be used to determine the priority used to discard information. If the required program schedule information is not available at the head end 12, the system generates a message indicating a lack of data, block 272.

As represented by block 274, the CPU 58 then scrolls the program grid 80 and, as appropriate, the time panel 82 and the channel panels 84 and returns to block 210 to display the new program schedule information in the scrolled program grid. If a lack of data message was generated at block 272, the message can be displayed within the program grid at the locations for which there is no data. Preferably the lack of data message takes the form of a program tile having a title such as TBA (for to be announced) or the like. These tiles can then be displayed within the program grid at locations for which no program schedule information is available. Alternatively, the message could be displayed and the program grid not allowed to scroll.

Although, for purposes of clarity, the scrolling process has been described as involving many discrete steps performed in a particular order, it should be appreciated that the scrolling preferably is accomplished in a smooth, visually appealing manner so that the individual steps are not observed by the user. For example, it is preferable that the program schedule information be present and revealed to the viewer gradually as a new row or column scrolls into view. To accomplish this, many of the steps described here may be performed concurrently or may be performed in a different order than described.

Figure 10A:
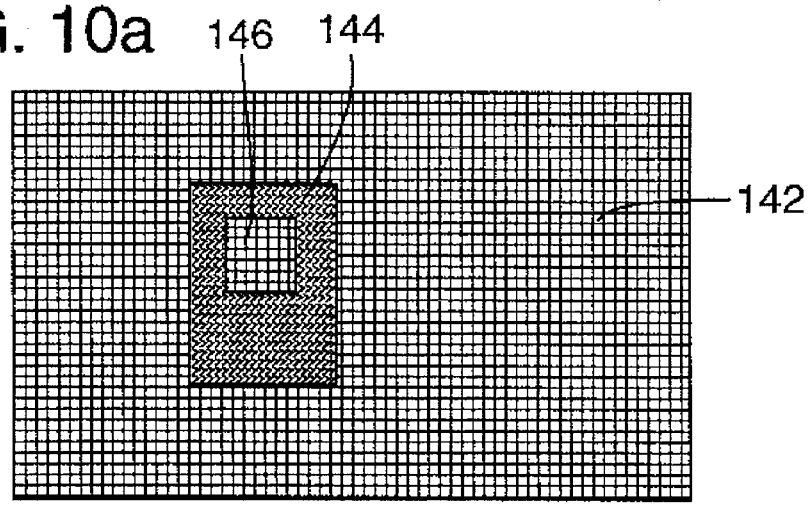
FIGS. 10a–10c are simple block diagrams illustrating the relationships between the different memories for storing program schedule information and the displayed program schedule information in accordance with one embodiment of the present invention.
Figure 10B:
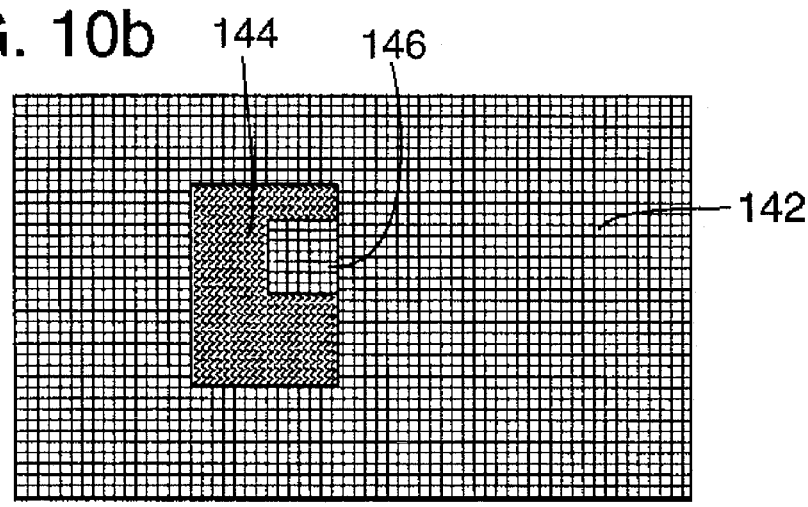
Figure 10C:
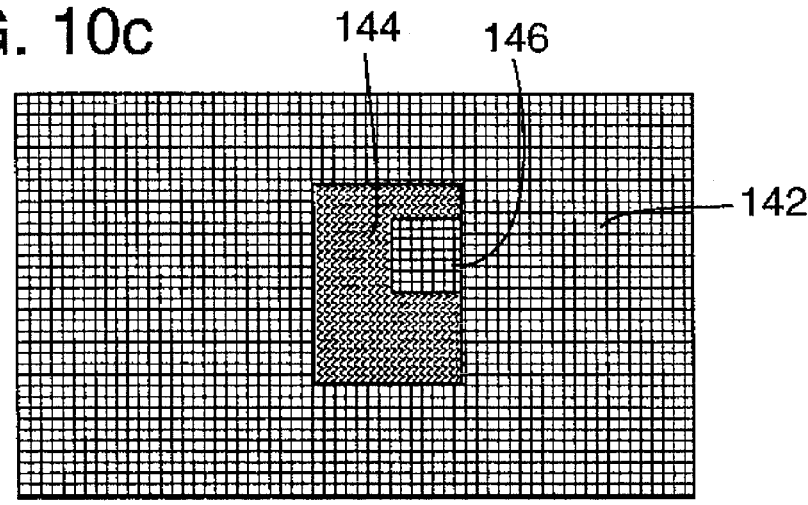

Schematic illustrations showing the interaction between the program guide, the interactive station controller, and the head end during the retrieval of program schedule information are shown in FIGS. 10a–10c. The relatively large amount of program schedule information available at the head end data base is represented by the largest window 142, the subset of that information that is also stored in the memory at the interactive station controller is represented by the middle window 144, and the subset of that information that is displayed in the program grid is represented by the small window 146. It should be appreciated that FIGS. 10a–10c are merely schematic representations intended to aid in understanding the interaction of the various components during the retrieval of program schedule information. The Figures are not intended to represent accurately the sizes of the various storage devices, which may vary widely from system to system, nor are they intended to represent the data structures used to store the program schedule information, which may also vary widely.

Scrolling the program grid can be thought of as moving the small window 146 within the large window 142 to reveal new information and, at the same time, cover other information. If the newly revealed information is within the middle window 144 (the information available at the interactive station controller), there is no need to obtain information from the large window 142 (the head end). Thus, the information stored at the interactive station controller (e.g. the middle window) serves as a buffer and allows some scrolling (e.g. movement of the small window) without the need to obtain information from the head end (e.g. the large window).

If however, the small window 146 is at a boundary of the middle window 144, as illustrated in FIG. 10b, additional movement reveal information not within the middle window 144. Thus, it is necessary to obtain this information from the large window 142 (the head end). As shown in FIG. 10c, in the preferred version of the program time guide, the middle window 144 moves with the small window 146 when the small window 146 reaches the boundary of the middle window 144. In other words, when the CPU 58 obtains the additional program schedule information needed to update the program grid from the head end 14, the CPU 58 also stores that information in the memory system 60 at the interactive station controller.

The current program time guide is well suited for use with interactive viewing systems that offer a variety of program sources and interactive services having various types and formats of programming. For example, some programs might be computer executable programs, such as a video game, which may be executed by the CPU 58, by processors associated with servers 26 at the head end 12, or both. Other programs may include traditional video that is provided by a computer executed program such as a movies-on-demand service in which a processor at the head end retrieves stored video information and provides it to a viewer station. Still other programs may include traditional video that requires some associated computer executed programming such as pay-per-view video in which a user can only receive the video with approval from a controlling computer program, typically executed at the head end. Of course, traditional program sources such as broadcast and cablecast networks can also be provided.

Figure 11:
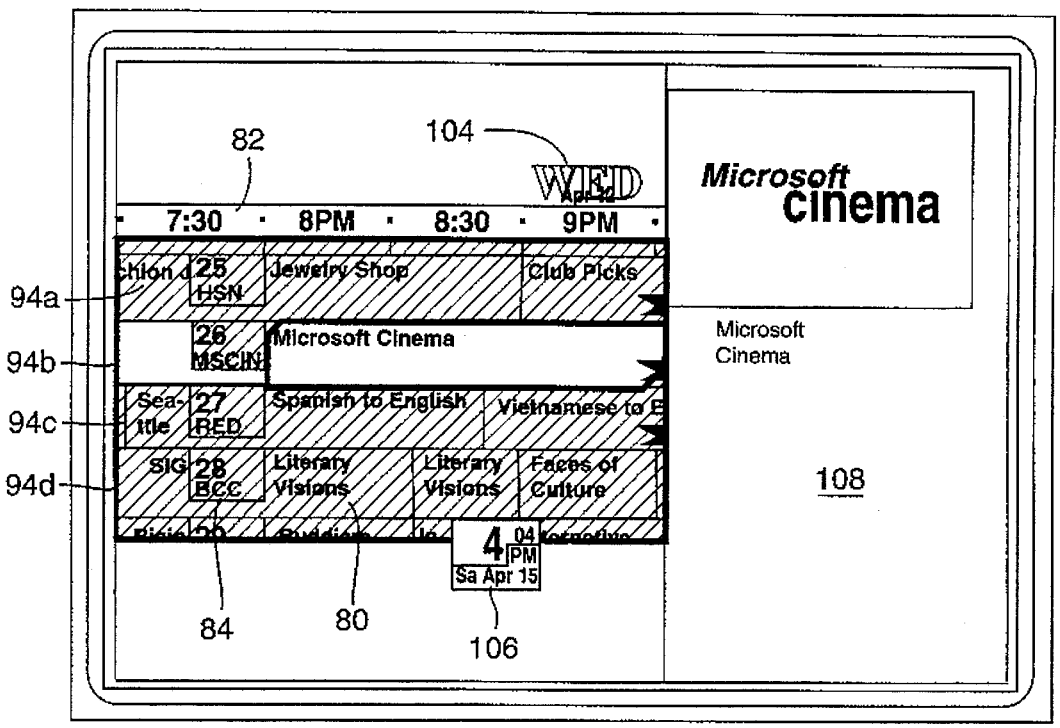
FIG. 11 illustrates a screen of the video display on which another sample of a preferred display of the program time guide is shown illustrating the display of a computer executable application as an available channel.

The current program time guide allows for the display of program schedule information for various types of program sources in a single, integrated program grid. To accomplish this, the program time guide assigns each program source, regardless of type, a channel number. For example, FIG. 11 illustrates movies-on-demand service in the program grid on the second row 94b as channel 26. Various other types of programs and interactive services can be treated in the same manner. The movies-on-demand service is assigned a channel number and is displayed in a row of the program grid. The channel for the movies-on-demand service can be selected by entering the assigned channel number using the numeric keypad or by navigating to the channel using the channel up/down key. In addition, the channel is accessible using the current program time guide or other program guides which might be available on the system. Frequently, computer executed programs and interactive services are not time-based. Rather, they are available on demand. If so, the rows for these programs are always highlighted to indicate that they are currently available.

Unlike a conventional cablecast or broadcast channel, selecting a channel assigned to a computer executed program or interactive service does not always cause a tuner to tone to a selected frequency to receive a broadcast or cablecast video signal. Rather, turning to the channel causes the CPU to launch the associated computer program which is then executed by the CPU, processors at the head end, or both. In this way, program schedule information for many types of programs and interactive services can be integrated into a single, easy to use program time guide.

Figure 12:
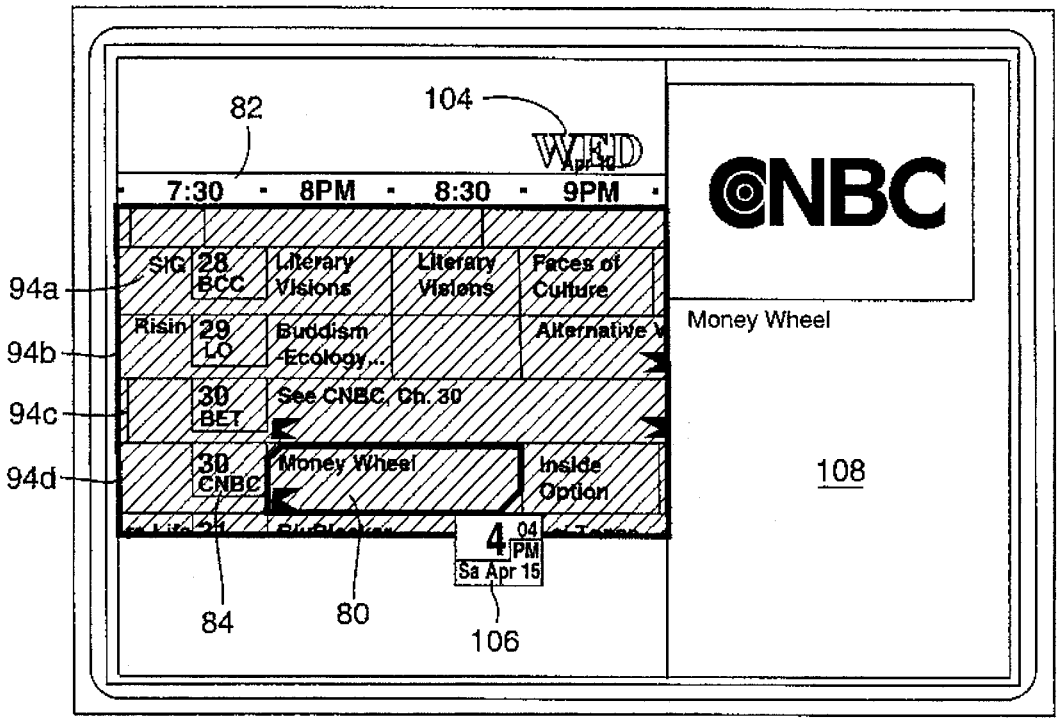
FIG. 12 illustrates a screen of the video display on which another sample of a preferred display of the program time guide is shown illustrating the display of program schedule information for a shared channel.

In some cases, a channel number is shared by two or more program providers that are available at different times. To accommodate these situations, the current program time guide allocates each provider a separate row in the program grid. As illustrated in FIG. 12, in which channel 30 is shared by two different television networks, each row 94c and 94d of the shared channel is labelled with the shared channel number. However, the channel name and logo are specific to each provider. During the time that any one of the sharing providers is active, programming for that provider is displayed in the normal manner, as illustrated in row 94d of FIG. 12. At the same time, no programming information is displayed for inactive providers. Rather, the rows for the inactive providers will contain a reference to the then active provider sharing that channel number, as shown in row 94c of FIG. 12. This allows users to easily identify sharing providers and to quickly determine which provider is available at any given time. This type of display also helps to avoid confusion as to the provider of various programs and the availability of various programs.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

What is claimed is:

1. In an interactive viewing system having a head end in two-way communication with a plurality of viewer stations having a video display operatively coupled to a controller, the head end providing to the viewer stations programming comprising a plurality of programs, the head end storing program schedule information identifying for the plurality of programs a time at which the program is available and a channel on which the program is available, the controller of at least one viewer station being capable of storing at least a portion of the program schedule information at the controller, a method of providing a user with program schedule information, the method comprising the steps of:

receiving at a controller a request from a user for program schedule information;

determining whether the requested program schedule information is stored at the controller;

in the case of a negative determination, communicating the request from the controller to the head end; and retrieving the requested program schedule information from the head end in the case of a positive determination, retrieving the requested program schedule information at the controller; and displaying a display of the requested program schedule information on a video display.

2. The method of claim 1 in which the display comprises:

a grid having channels displayed along one axis and time along another axis;

a plurality of program tiles, each program tile corresponding to a program, the program tiles positioned within the grid at the intersection of the channel on which corresponding program is available and the time at which the corresponding program is available; and a focus frame identifying one of said program tiles.

3. The method of claim 2 in which the focus frame can be moved in response to a user's command to selectively identify a selected program tile, the command being input to the controller with an input device.

4. The method of claim 3 in which the user can move the focus frame to select a time and channel for which program schedule information is displayed.

5. The method of claim 4 in which at least one of the program tiles corresponds to a program that is a computer executed application.

6. The method of claim 5 in which time is displayed on a horizontal axis of the grid and channels are displayed along a vertical axis of the grid.

7. The method of claim 5 in which time is displayed along a vertical axis of the grid and channels are displayed along a horizontal axis of the grid.

8. The method of claim 4 in which the size of the program tile corresponds to the length in time of the corresponding program.

9. The method of claim 8 in which a program tile that is too large to be completely displayed within the grid is provided with an indicator to indicate that the program tile is only partially displayed.

10. The method of claim 2 in which program tiles corresponding to currently available programs are displayed in a visually distinct manner from program tiles corresponding to currently unavailable programs.

11. The method of claim 10 in which program tiles corresponding to currently available programs are displayed in a first color and program tiles corresponding to currently unavailable programs are displayed in a second color.

12. The method of claim 2 in which the grid defines vertical columns and horizontal rows, each column being associated with a particular time period and each row being associated with a particular channel, the program tiles capable of spanning more than one column to represent a program with a length greater than the time period, and in which a user can move the focus frame vertically by entering a first command and horizontally by entering a second command, vertical movement of the focus frame being tied to an anchor column, the anchor column being changeable by a user inputting the second command.

13. An interactive system for providing program scheduling information to the user of an interactive program viewing system having a central head end in bidirectional communication with multiple viewer stations that include a video display operably coupled to a controller and an input device for inputting commands to the controller, the head end delivering a plurality of programs at different times over a plurality of channels to the plurality of viewer stations, the system comprising:

a first memory located at the head end for storing program schedule information, the program schedule information identifying for the plurality of programs a time at which the program is available and a channel on which the program is available;

a second memory located at a controller for storing a portion of the program schedule information stored at the head end;

the controller operative, in response to a command input through the input device, to generate a display of a selected first portion of the program schedule information on the video display, the selected first portion including program schedule information for at least two of the plurality of programs, the selected first portion being determined by a user of the system, wherein if the selected first portion is not stored in the second memory the controller retrieves the selected first portion from the first memory for display.

14. The system of claim 13 wherein the display includes a grid having time along a first axis and channels along a second axis.

15. The system of claim 14 in which the plurality of programs included within the selected first portion of program schedule information are each represented by a program tile positioned within the grid at the intersection of the times at which the program is available and the channel on which the program is available.

16. The system of claim 15 further comprising a focus frame which identifies one of the program tiles.

17. The system of claim 16 in which the focus frame can be moved within the grid to selectively identify one of the program tiles.

18. The system of claim 17 in which the focus frame can be moved to select a second selected portion of the program schedule information, the second selected portion being displayed in place of the first selected portion in the display.

19. The system of claim 18 wherein the controller obtains at least part of the second selected portion from the first memory.

20. In an interactive viewing system having a head end in two-way communication with multiple viewer stations having a video display operably coupled to a controller and an input device for inputting commands to the controller, the head end delivering a plurality of programs at different times over a plurality of channels to the multiple viewer stations, the system comprising:

a first memory located at the head end for storing program schedule information said program schedule information identifying for the plurality of programs a time at which the program is available and a channel on which the program is available; and a second memory located at the controller for storing a portion of the program schedule information stored at the head end, the controller operative, in response to a user command input through the input device, to generate a display of program schedule information on the video display, the display comprising:

a grid with a plurality of times along a first axis and a plurality of channels along a second axis;

a plurality of program tiles, each associated with a program, positioned within the grid at the junction of the time at which the program is available and the channel on which the program is available; and a focus frame indicating a selected program tile, the focus frame being movable in response to commands input through the input device to allow user selection of the times and channels for which program schedule information is displayed, wherein the controller obtains the program schedule information for the display from the first memory if it is not stored in the second memory.

21. In a controller for an interactive viewing system having a head end in two-way communication with multiple viewer stations having a video display operably coupled to the controller and an input device for inputting commands to the controller, the head end delivering a plurality of programs at different times over a plurality of channels to the multiple viewer stations, the head end comprising a first memory located at the head end for storing program schedule information said program schedule information identifying for the plurality of programs a time at which the program is available and a channel on which the program is available, the system comprising:

a second memory located at the controller for storing a portion of the program schedule information stored at the head end, the controller operative, in response to a user command input through the input device, to generate a display of program schedule information on the video display, the display comprising:

a grid with a plurality of times along a first axis and a plurality of channels along a second axis;

a plurality of program tiles, each associated with a program, positioned within the grid at the junction of the time at which the program is available and the channel on which the program is available; and a focus frame indicating a selected program tile, the focus frame being movable in response to commands input through the input device to allow user selection of the times and channels for which program schedule information is displayed, wherein the controller obtains the program schedule information for the display from the first memory if it is not stored in the second memory.

* * * * *